United States Patent [19]

Papst, deceased et al.

[11] 3,820,561

[45] June 28, 1974

[54] NON-RETURN VALVE ASSEMBLY

[76] Inventors: Josef Papst, deceased, late of Vienna, Austria; Stephanie Papst, Ghelengasse 42/9, Vienna, Austria; Brigitte Brockmuller, heirs, 26 Tarragon Dr., Kirkland, Montreal, Canada

[22] Filed: May 23, 1973

[21] Appl. No.: 363,135

[52] U.S. Cl.......... 137/512.2, 137/525.3, 137/525.5
[51] Int. Cl.............................................. F16k 15/16
[58] Field of Search......... 137/512.2, 516.27, 525.3, 137/525.5

[56] References Cited
UNITED STATES PATENTS
157,791  12/1874  Cameron .................... 137/512.2 X
919,036  4/1909  Langer ......................... 137/512.2 X
2,151,746  3/1939  Cody............................ 137/525.3 X
2,970,608  2/1961  Doeg............................ 137/525.5 X FOREIGN PATENTS OR APPLICATIONS
833,755  4/1960  Great Britain.................. 137/512.2

*Primary Examiner*—William R. Cline
*Attorney, Agent, or Firm*—Watson, Cole, Grindle & Watson

[57] ABSTRACT

A valve assembly particularly for use in piston compressors wherein a valve opening is covered by a pair of superposed plate-like closure members. The closure member closer to the valve seat has an aperture and the closure members have stroke limiting stops at different distances from the valve seat so that when the member closer to the seat has reached its maximum opening, the other member can still open further to uncover said aperture.

2 Claims, 5 Drawing Figures

3,820,561
PATENTED JUN 28 1974
SHEET 1 OF 2
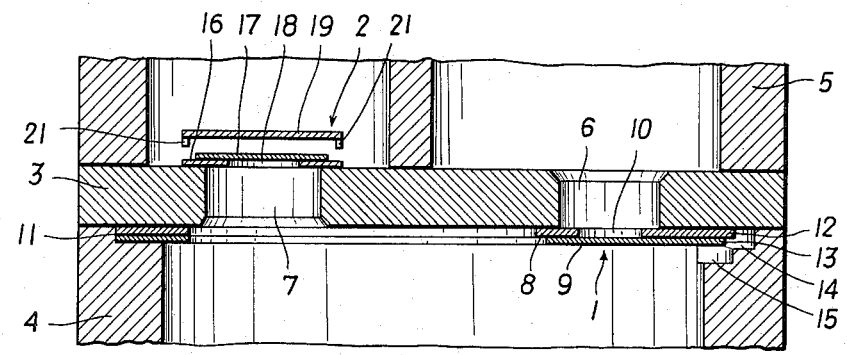
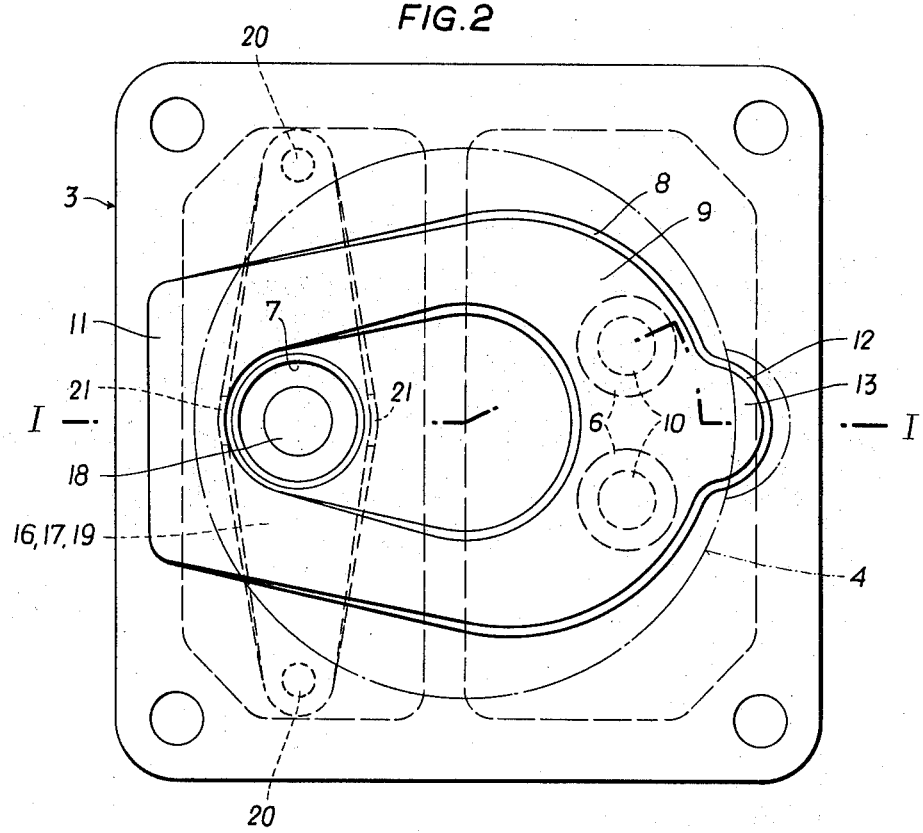

3,820,561

3,820,561

NON-RETURN VALVE ASSEMBLY

This invention relates to a valve assembly particularly for use in variable speed piston compressors, the assembly comprising a valve seat, defining a flow passage controlled by plate-like or tongue-like closure members with stops being provided to limit the stroke of said closure members.

The speed of rotation at which the compressor operates must be taken into consideration when constructing the compressor valves since in particular the necessary suspension and stroke of a closure member largely depends on the speed of rotation. When using the hitherto conventional valves e.g. plate or lamellar valves, an optimum construction of the suspension and stroke is therefore only possible for a narrow speed range. No problems arise for compressors driven at a constant speed. If on the other hand the compressor is driven at a variable speed, as is the case for example in braking compressors on vehicles, the valves can only be designed for an average speed. This can result in a flutter of the closure member at low speeds and a late contact closing at higher speeds. Both have an adverse effect on the working life of the movable valve parts and on the efficiency of the compressor.

The invention is concerned with providing a valve which operates with minimal flutter and late contact closing over a comparatively wide speed range.

The invention provides a valve assembly wherein a flow passage formed in a valve seat is covered by a pair of movable superposed closure members, the closure member closer to the valve seat being formed with an aperture, and the closure members having separate stroke limiting stop means at different distances from the seat respectively so that when the member closer to the seat reaches its maximum distance from the seat, the other closure member can move further to uncover said aperture.

With this construction, at low speeds, the two closure members are not separated from each other so that the valve operates like a valve with a single closure member. At high speeds, however, the closure member further from the seat is released from the closure member closer to the seat when this latter closure member abuts its stop means, whereby the fully opened valve provides additional through-ways leading through the aperture in the latter closure member, and thus additional passage cross-sections are provided. When closing the valve the closure member further from the seat first closes on the closure member closer to the seat, and thus causes a prompt closing thereof so that late closing is minimized.

By selecting the size of the aperture, in particular the surface proportions between the aperture and the through passage which is covered by the closure member closer to the seat, the valve can be adapted to the operating conditions prevailing, particularly the speed range and pressure ratios. Two superposed closure members can be used or several superposed closure members can be used where only the closure member furthest from the seat has no apertures, and the apertures in the closure members lying therebeneath preferably have different sizes. The closure member closest to the valve seat has the largest apertures. A valve assembly according to the invention is thus suitable both as a working valve for piston compressors and a non-return valve for incorporation in a pipeline.

If locking springs are provided for the closure members or the latter are firmly clamped with elastic bias on the valve seat, each closure member which covers the apertures of a closure member therebeneath is preferably loaded by greater specific spring tensions related to the biased surface, which it covers directly when the valve is closed, as compared to the closure member lying therebeneath, so that when opening the valve, both closure members are simultaneously raised from the valve seat. Preferably, only the uppermost closure member is directly loaded by locking springs or resiliently biased against the valve seat. The spring tensions acting on the top closure member thereby hold each closure member lying underneath in the closed position of the valve on the valve seat.

In a further embodiment of the invention, the closure member lying closer to the valve seat is supported in the region of its aperture by ribs provided in the through passage of the valve seat when the valve is closed. The aim of this measure is to sufficiently support the closure members when the valve is closed so that they can withstand the differential pressure acting thereon without a solid structure.

The stop means for the closure member closer to the valve seat is preferably defined by several stops spaced at a lateral distance from each other whereby recesses are provided between said stops for the passage of the medium flowing through the valve. Obstruction of the flow through the aperture is therefore minimized and the medium is allowed to flow away at both edges of the closure member further from the seat.

The invention will now be described by way of example with reference to the accompanying drawings, in which:

FIG. 1 is an axial cross-section through a valve assembly according to the invention inserted between the cylinder and cylinder head of a piston compressor;

FIG. 2 is a bottom plan view of the valve shown in FIG. 1;

Figure 3:
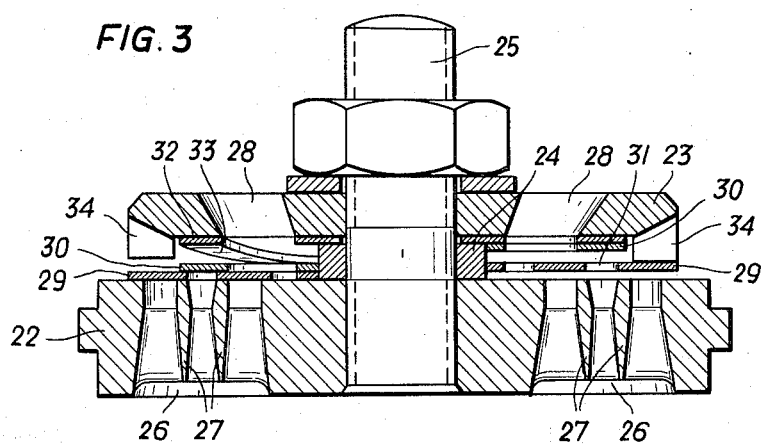
FIG. 3 is an axial cross-section of an annular plate valve assembly according to the invention, shown closed on the left half of the Figure and opened on the right half of the Figure.

The valve assembly illustrated in FIGS. 1 and 2 consists of a suction valve 1 and a pressure valve 2 both designed as so-called lamellar valves. The valves have a common valve seat 3 situated between the cylinder 4 and cylinder head 5 of a piston compressor. Through passages 6 for the suction valve and a through passage 7 for the pressure valve are formed in the valve seat 3. The through passages of the suction valve 1 are controlled by two superposed closure members 8 and 9, of which the closure member 8 is closer to the valve seat 3 and the closure member 9 is mounted over the closure member 8. Apertures 10 which are covered by the closure member 9 are formed in the closure member 8.

The closure members 8, 9 of the suction valve 1 according to FIG. 2 consist of ring-like lamellae which at the end indicated by 11 are inserted between the valve seat 3 and the cylinder 4 and have at their other end tongues 12, 13 with which are associated stops 14 and 15 in the cylinder 4 for stroke limitation of the lamellae. The two stops 14,15 lie at different distances from the valve seat 3 so that when the valve is fully open, the two closure members 8,9 are separated from each other whereby the outer closure member 9 releases the apertures 10 in the closure member 8. The pressure valve 2 is likewise provided with two superposed closure members 16, 17 which are designed as strip-like lamellae and of which the closure member 16 closer to the valve seat 3 is provided with an aperture 18 covered by the closure member 17. A plate 19 which together with the closure members 16,17 is fastened by bolts 20 to the valve seat 3 is located above the two closure members 16, 17. In its center the plate 19 has two stops 21 which project towards the valve seat 3 and serve as stroke limitation stops for the closure member 16 which is slightly wider than the closure member 17 which strikes the plate surface itself.

Figure 4:
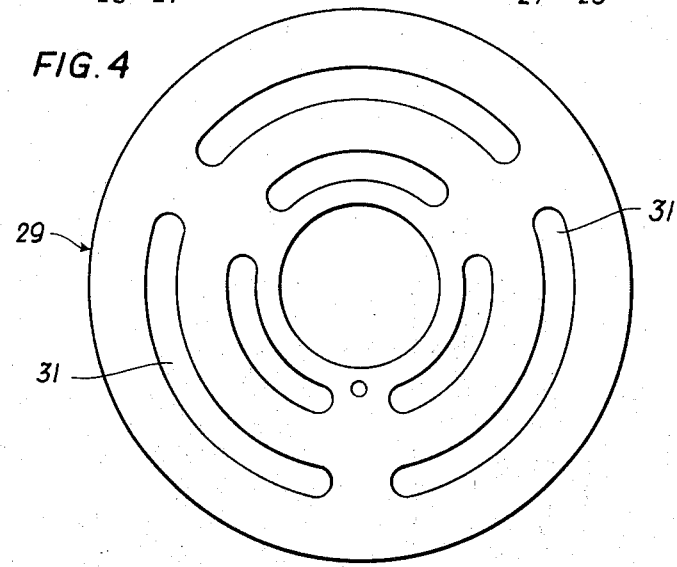
FIGS. 4 and 5 are plan views of the closure members of the assembly shown in FIG. 3.
Figure 5:
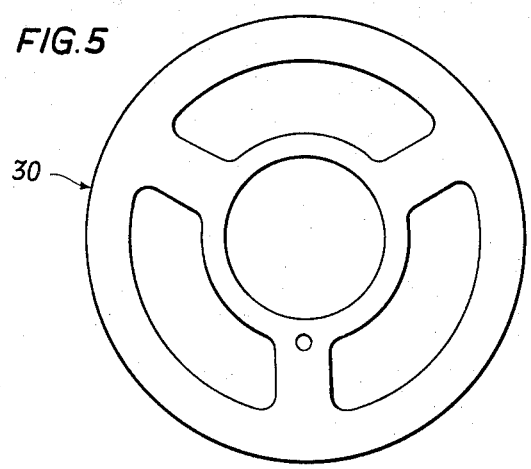

The annular plate valve indicated in FIG. 3 has a valve seat 22 and a plate 23 which are connected together through a center screw 25 with the interposition of a guide ring 24. Through passages 26 which are provided in the valve seat 22 are divided by additional ribs 27 and channels 28 are located in the plate 23. Closure members 29 and 30 consist in this valve of perforated plates which are guided in a sliding manner on the guide ring 24. The closure member 29 indicated in FIG. 4 is closer to the valve seat 22 and in the region of the through passages 26 has arcuate apertures 31 which are covered by the second closure member 30 shown in detail indicated in the plan view in FIG. 5. The ribs 27 in the through passages 26 span the apertures 31 so that the plate-like closure member 29 is additionally supported at these points. Furthermore, a spring plate 32 is provided in the valve according to FIG. 3 and acts together with the spring arms 33 on the upper closure member 30. The lower closure member 29 is not loaded by springs. The plate 23 has on its outer perimeter stops 34 for the stroke limitation of the closure member 29, these stops being located at a smaller distance from the valve seat 22 than the stop surfaces of the plate 23 or spring plate 32 lying in front thereof which are associated with the upper closure member 30. Recesses for the passage of the medium which emerges through the apertures 31 when the valve is open are located between the stops 34.

As can be seen from the drawings, in all embodiments the two closure members 8,9; 16, 17; 29,30 lie on top of each other without any play when the valve is closed so that both the through channels 6,7, 26 in the valve seat and the apertures 10, 18, 31 in the closure member lying directly on the valve seat are sealed. When the valve is opened, at first both closure members together are moved from the valve seat until the closure member 8, 16, 29 closer to the valve seat reaches its stroke limitation stop 14, 21, 34. The other closure member 9, 17, 30 is then raised from the first closure member to a greater or lesser distance in dependence on the speed of the compressor and thereby uncovers the apertures in the first member so that the medium can also flow through these apertures. Only at high speeds is the upper or outer closure member raised so far from the first closure member that it reaches its stroke limitation stop. During closing of the valve, the outer closure member first contacts the first closure member whereby it seals the apertures in the first member and only after this are the two closure members together moved onto the valve seat.

The described opening and closing movements of the valve according to the invention are initiated in that the two closure members are loaded by uneven spring tensions related to the surface covered by said closure members when the valve is closed and subjected to pressure. Only the outer or upper closure member is preferably directly biased by a spring force. In the embodiment according to FIGS. 1 and 2 no special valve springs are provided. In the manner which is usual in the case of lamellar valves, the closure members are secured on the valve seat due to their inherent elasticity. By a suitable deflection, the closure members can be resiliently biased towards the valve seat wherein the outer closure member can be more strongly biased towards the valve seat than the closure member closer to the valve seat, so that substantially the same effect is achieved as in the embodiment according to FIGS. 3 to 5, wherein only the outer closure member is loaded by a spring plate. A valve assembly according to the invention can thus be adapted to the speed at which the compressor is driven so that both the possibilities of flutter at low speeds and late contact closing at higher speeds are minimized.

What is claimed is:

1. A valve assembly comprising a valve seat having at least one flow passage therein, first and second closure members mounted in superposed relation on said valve seat and covering said flow passage, said first closure member lying on said valve seat and having an opening therein overlying said passage, said second closure member overlying said first closure member, a first stroke limitation stop means for said first closure member located at a first distance from said valve seat, a second stroke limitation stop means for said second closure member located at a second distance from said valve seat, said second distance being greater than said first distance plus the thickness of said second closure member, said second closure member being so mounted as to be resiliently biased toward said valve seat whereby, during an initial opening of the valve, said closure members together move away from said valve seat until said first closure member abuts against said first stop means which limits the maximum opening of said first closure member to uncover said opening, said second closure member moving farther away from said valve seat until it abuts against said second stop means to uncover said opening of said first closure member.

2. The valve assembly according to claim 1 wherein said first stop means comprises spaced stops located adjacent the periphery of said first closure member, said spaced stops defining passages therebetween for flow of the medium when the valve is open.

* * * * *

UNITED STATES PATENT OFFICE
CERTIFICATE OF CORRECTION

Patent No. 3,820,561　　　　　　　　Dated June 28, 1974

Inventor(s)　Josef Papst

It is certified that error appears in the above-identified patent and that said Letters Patent are hereby corrected as shown below:

In the title page please insert --Assigned to Hoerbiger Ventilwerke Aktiengesellschaft of Vienna, Austria--

Signed and sealed this 26th day of November 1974.

(SEAL)
Attest:

McCOY M. GIBSON JR.　　　　　　C. MARSHALL DANN
Attesting Officer　　　　　　　Commissioner of Patents